(No Model.) 3 Sheets—Sheet 1.

H. REILY.
Saw Filing Machine.

No. 232,062. Patented Sept. 7, 1880.

Witnesses:
P. C. Dietrich
Fred G. Dietrich

Inventor:
H. Reily
per F. A. Lehmann,
Atty.

(No Model.) 3 Sheets—Sheet 2.

H. REILY.
Saw Filing Machine.

No 232,062. Patented Sept. 7, 1880.

Witnesses:
P. C. Dietrich.
Fred G. Dieterich

Inventor:
H. Reily.
per
F. A. Lehmann,
Atty (No Model.)  3 Sheets—Sheet 3.

H. REILY.
Saw Filing Machine.

No. 232,062.  Patented Sept. 7, 1880.

Witnesses:
W. W. Mortimer
C. H. Isham

Inventor:
H. Reily
per
F. A. Lehmann,
Atty.

UNITED STATES PATENT OFFICE.

HENRY REILY, OF RIXFORD, PENNSYLVANIA.

SAW-FILING MACHINE.

SPECIFICATION forming part of Letters Patent No. 232,062, dated September 7, 1880.

Application filed March 23, 1880. (No model.)

*To all whom it may concern:*

Be it known that I, HENRY REILY, of Rixford, in the county of McKean and State of Pennsylvania, have invented certain new and useful Improvements in Saw-Filing Machines, (Case A;) and I do hereby declare the following to be a full, clear, and exact description of the invention, such as will enable others skilled in the art to which it pertains to make and use it, reference being had to the accompanying drawings, which form part of this specification.

My invention relates to an improvement in saw-filing machines; and it consists in the combination of devices which will be more fully described hereinafter, whereby the saw is clamped in position and the file given a vertically-reciprocating motion, and made to approach the saw, so as to cut on one stroke and move back from the saw on the other stroke, as will be more fully described hereinafter.

The object of my invention is to provide a machine in which the saw can be securely clamped while being sharpened, and which is provided with suitable guides or gages, whereby saws of all kinds can be readily sharpened and set.

Figure 1:
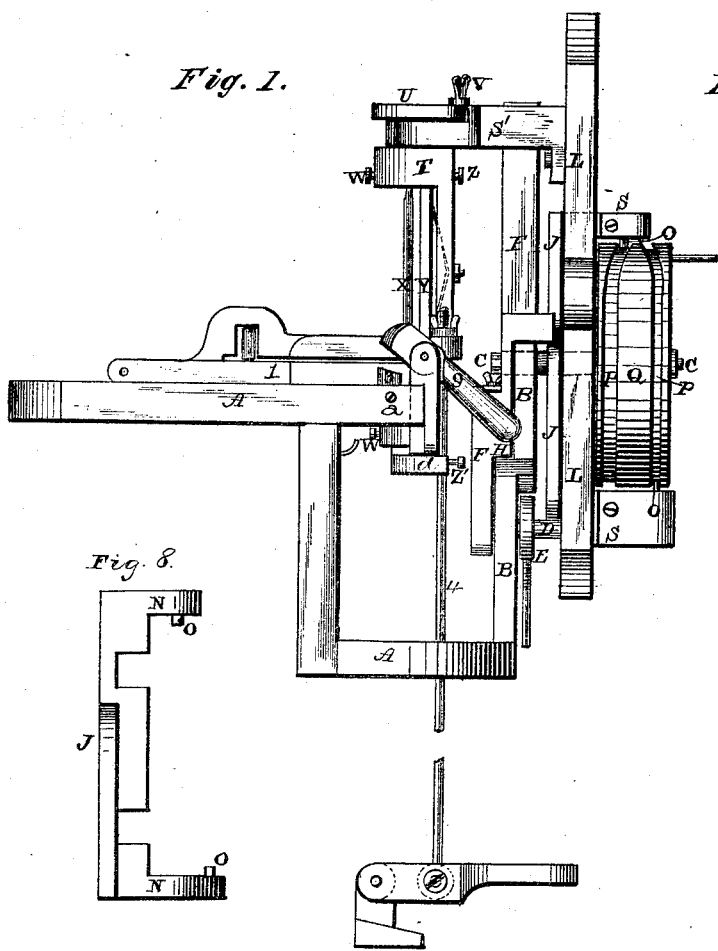
Figure 8:
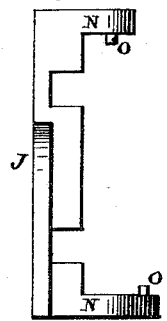
Figure 3:
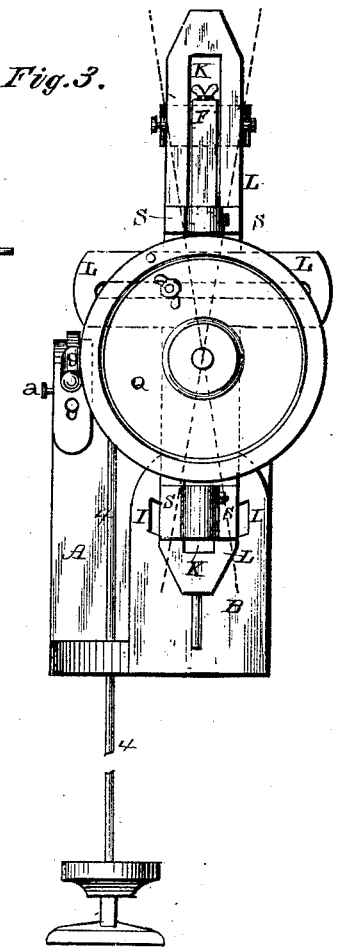
Figure 9:
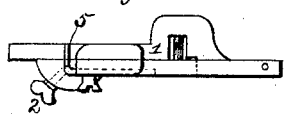
Figure 5:
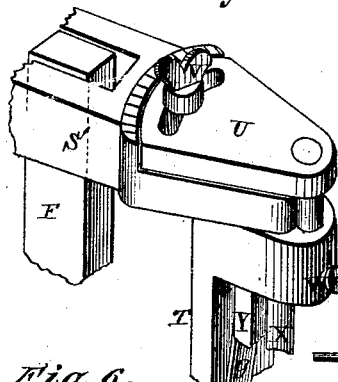
Figure 2:
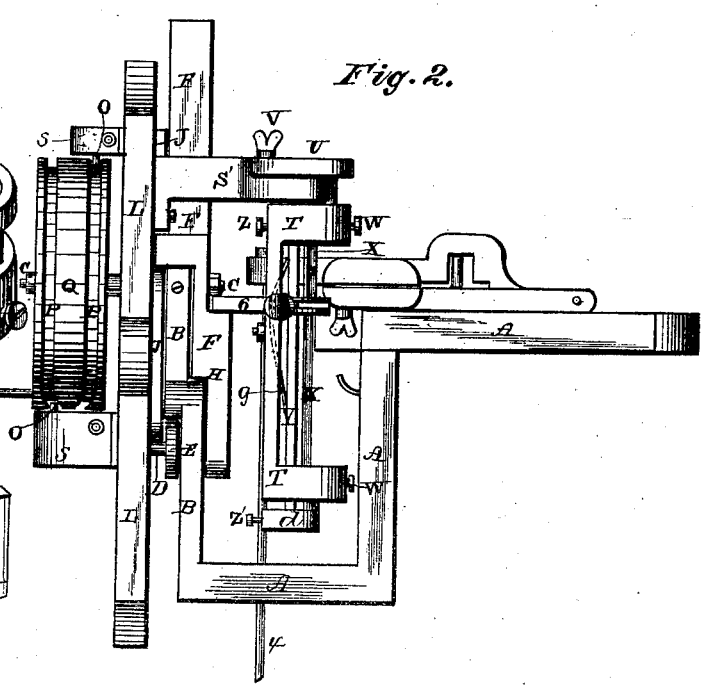
Figure 6:
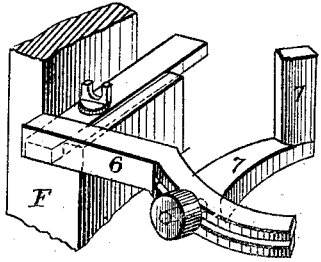
Figure 7:
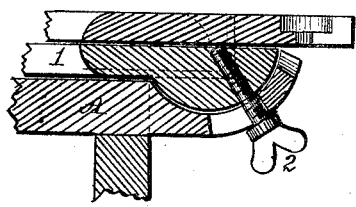
Figure 4:
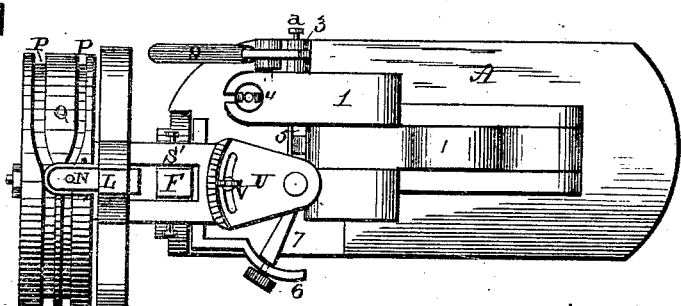
Figure 10:
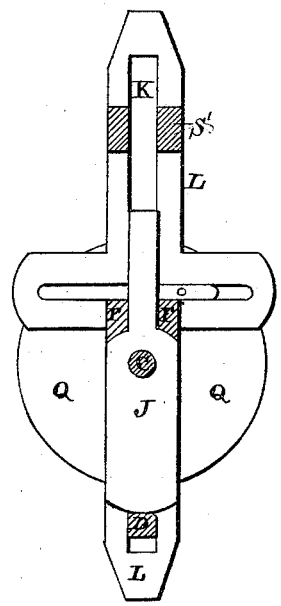
Figure 11:
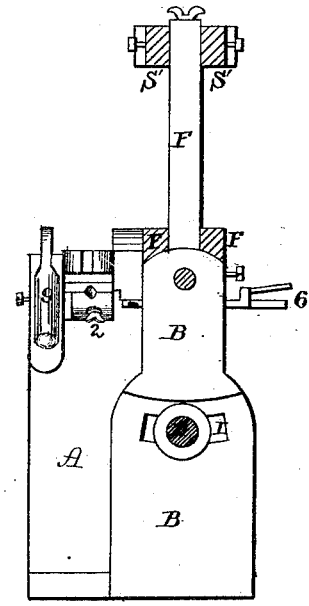
Figures 12, 13:
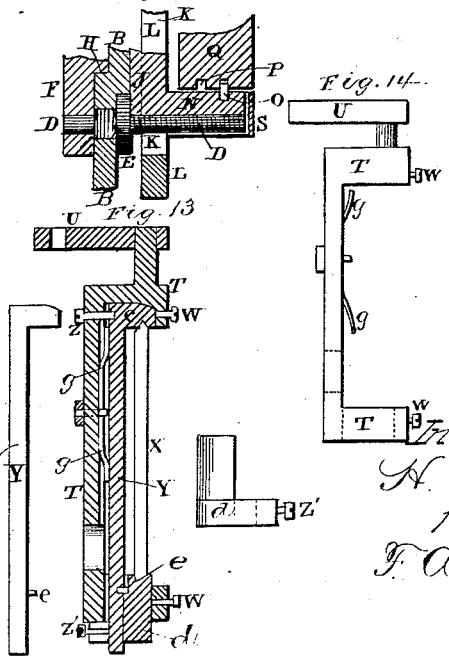
Figure 14:
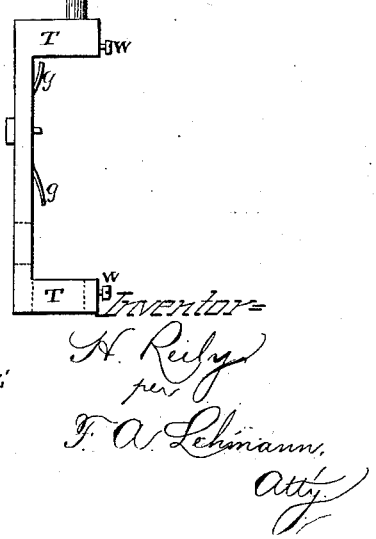

Figures 1 and 2 are side elevations of my invention, taken from opposite sides. Fig. 3 is an end view of the same. Fig. 4 is a plan view. Figs. 5, 6, 7, 8, and 9 are detail views. Fig. 10 is a side elevation of the guide J, frame I, and wheel Q detached from the other parts of the machine. Fig. 11 is a side view of the frame B, guide F, and the devices for holding the saw while it is being filed. Fig. 12 is a detail section of the clamp which binds the pivoted frame in position. Figs. 13 and 14 are detail views of the file-holder.

A represents a suitable frame, which is to be securely clamped to one edge of the bench, and which frame may be either of the form here shown or any other that may be preferred. Extending up from the lower part of this frame is the standard B, which has the pivotal bolt C passed through its upper end, and upon this bolt is placed the vertically-moving frame and the guide upon which the frame moves. Cut through this standard B, near its center, is a curved slot, I, through which the screw-bolt and guide D is passed, which bolt has a suitable clamping-nut, E, placed upon it for the purpose of clamping the pivoted guide F at any desired angle. Upon the inner side of this standard B there is marked a suitable scale for the purpose of adjusting the guide, and by means of the guide the file-carrying mechanism can be adjusted at any desired angle at which it may be desired to file the teeth of the saw. As this pivoted guide F has no vertical movement, it is provided with the shoulders H, which catch upon the top of corresponding shoulders formed on the standard, and which shoulders are cut on a curve to correspond with the curve of the slot I.

Placed upon the pivotal bolt C, on the outer side of the standard B, is the guide J, which has three flanges formed on its outer side, which project into the slot K of the vertically-moving frame L, and serve as guides upon which this frame moves. These flanges are separated from each other for the purpose of allowing the wrist-pin of the operating-wheel Q to pass freely back and forth between them as the wheel revolves. Upon each end of this guide J is a projection, N, which passes through the slot K in the vertically-moving frame L, and each projection has a stud or projection, O, on its inner side, which studs catch in the two cam grooves P of the operating-wheel Q.

The vertically-moving frame L is held against the guide J by means of the bands or straps S, which are passed around the ends of the projections which extend through the slot, and these bands hold the frame in close contact with the guide as the frame moves up and down. These straps have their ends turned outward, as shown in Fig. 3, and these turned-out ends act as guards to keep the frame always straight.

Owing to the shape of the two cam-grooves in the surface of the operating-wheel Q the guide and the vertically-moving frame are alternately drawn outward toward the wheel Q, which is held in place upon the pivotal bolt C by means of a suitable shoulder or other similar device, and then forced inward against the standard B. By this movement the file is moved toward the saw upon one stroke and drawn backward upon the other.

Secured to the upper end of the vertically-moving slotted frame L is an arm, S', which has a sufficient opening through it to allow it to play up and down and back and forth over the upper end of the pivoted guide F, and which arm serves to support the file and its holder.

The file-holder T is secured to the slotted plate U, which rests upon the top of the arm S', and which can be adjusted to the scale on the arm, for the purpose of adjusting the file at any desired angle to the tooth. This plate U is secured to the projection on the upper end of the file-holder, and this projection serves as a pivot which catches on the inner end of the arm, and upon which the file-holder and the plate U turn. After the plate and the file-holder have been adjusted to any desired angle they are rigidly secured in place by means of the set-screw V, so as to prevent the file-holding frame from turning around, and thus changing the angle at which the file has been adjusted.

This file-holder is of the form shown in Fig. 14, and has a recess made in its upper end and a hole through its lower end. Through this hole in its lower end is passed the device Y, which has the head $c$ on its upper end to fit in the recess formed in the under end of the holder T. The lower end of this device Y is perfectly straight and projects down through the hole in the lower part of the holder T, and over this straight end of the device Y is passed the vertically-adjustable block $d$. This block is secured to the device Y by means of the set-screw Z', and between this block $d$ and the head $c$ the file X is held. As this block is made vertically adjustable, files of different lengths can be used equally well. In order to keep this block always in line with the device Y, a small stud, $e$, is used, which catches in the groove made in the inner face of the block. In order to allow the file to yield before any undue pressure, a spring, $g$, is placed behind the device Y, as shown in Figs. 13 and 14. When it is desired to hold the device Y rigidly in position the set-screw Z is used to force the device Y forward against the screws W, and when it is desired to force the file backward, so that it will not cut so much, the set-screws W are used. By means of this adjustment of the file it can also be made to cut more or less at each stroke, just in proportion as it is adjusted to or from the saw. By means of the compound motion that is given to the file by the operating-frame, which reciprocates both vertically and horizontally, the file is moved toward the saw, so as to file the teeth. As the file is about to descend, and then just as it reaches the end of its stroke and before it begins to ascend, the file moves back from the saw, and then rises upward without touching it.

Upon the top of the frame A is secured the clamp 1 by means of the set-screw 2, which set-screw passes through a curved slot in the end of the frame for the purpose of holding the clamp 1 when it has been adjusted in either a horizontal or an inclined position, as may be preferred. The inner end of this clamp is made considerably thicker, and is cut on a curve, and this curved part rests in a corresponding curved recess in the table, so that the clamp may be raised at its outer end and lowered at its inner end, as the kind of work to be performed may require. After the clamp has been adjusted into the desired position it is only necessary to tighten the set-screw 2, and the clamp will be held rigidly in place. The upper portion of the clamp is hinged to the lower portion at its outer end, and between these two parts the saw is held while being filed. By means of the adjustment that can be given to the clamp by means of the thickened and rounded portion on its inner end, the recess and slot in the frame A, and the set-screw 2, the saw that is held between the inner ends of the clamp can be adjusted into any desired relation to the anvil 3 for the purpose of giving the teeth any desired amount of set. The lever 9, which sets the teeth upon the anvil, is also pivoted in a bearing, which is adjustable up and down in the frame, so as to adapt itself to thin or thick saws. This anvil, having an inclined top, can be raised and lowered in the frame, and is rigidly secured in any desired position by means of the set-screw $a$, according as it is desired to give the teeth a greater or less set.

Passing through the frame A and up through the upper part of the clamp is a rod, 4, which is provided with a thumb-screw on its upper end, and which is provided with a treadle at its lower end, which treadle is fastened to the floor at one end in any suitable manner. By means of this treadle the rod can be drawn downward so as to depress the upper portion of the clamp upon the saw, and thus hold it securely while the file is at work upon it. The portion of the upper part of the clamp through which the rod passes is provided with a slot, so as to allow this portion of the clamp to be readily detached from the rod at any time after the rod has been raised upward.

By adjusting the thumb-nut upon the top of the rod the clamp can be readily fastened to saws of different thicknesses.

Secured to the under side of this clamp, at its inner end, is a movable guide, 5, against which the teeth of the saw press while the saw is being filed.

Adjustably secured to the pivoted guide F is a slotted arm, 6, which has its outer end made curved, and through this curved end is made a slot, in which the gage or guide 7 may be adjusted and secured. This guide is made of the same shape as the file upon that part where it fits the teeth of the saw, and after this guide has been fitted to the teeth of the saw, while it is held in the clamp, the file is adjusted to the same pitch or angle. This guide 7 catches alternately in the teeth of the saw and regulates the distance which the saw is to be moved forward as each new tooth is presented to the file to be sharpened. After the saw has been adjusted to the movable guide, which is secured to the front end of the clamp and to this movable guide 7, the saw cannot possibly be sharpened otherwise than correctly.

In connection with this machine I design using a gage which consists of a flat plate having different-shaped notches cut in its two opposite edges, which notches are arranged in groups of three, which correspond to different-shaped teeth of different kinds of saws. By comparing the saw with any one of the set of notches in this guide the file and the gage for the saw can be readily set, and then it is only necessary to place the saw in position and begin working upon it.

By turning the operating-wheel to the right the file will cut only upon a downward stroke; but by reversing this motion the file will be moved away from the saw upon the downward stroke and made to sharpen the teeth on its upward movement.

Having thus described my invention, I claim—

1. In a saw-filing machine, the combination of the frame A, standard B, provided with the slot I, the pivoted guide F, and its clamping-bolt D and nut E, with the guide J, frame L, operating-wheel Q, and the file-holder, substantially as shown.

2. The combination, in a saw-filing machine, of the guide J, provided with projections N and studs O, with the frame L, having the slot K, the wheel Q, provided with the grooves P, the pivoted bolt C, and the straps S, substantially as shown.

3. The pivoted guide F, in combination with the slotted frame L, guide J, operating-wheel Q, slotted arm S', which passes down over the top of the guide F, and a file-holder which can be adjusted on the arm so as to turn the file in any direction, substantially as described.

4. In a saw-filing machine, the combination of the holder T, device Y, having the head $c$, block $d$, and the file X, substantially as set forth.

5. In a saw-filing machine, the combination of the clamp 1, formed of two parts, which are pivoted or hinged together, and having the rounding part on its under side, with the frame A, having a recess to receive the rounding part of the clamp, the set-screw 2, and the clamping-rod 4, substantially as specified.

6. The combination, in a saw-filing machine, of the clamp for holding the saw, having the movable guide 5 secured to it, with the curved slotted arm 6 and the gage 7, substantially as shown.

7. In a saw-filing machine, the combination of the file-holder T, device Y, block $d$, spring $g$, and the set-screws, substantially as described.

In testimony that I claim the foregoing I have hereunto set my hand.

HENRY REILY.

Witnesses:
BENJ. WALKER,
J. M. WALKER.